US012767343B2

(12) United States Patent
Morton et al.

(10) Patent No.: US 12,767,343 B2
(45) Date of Patent: Oct. 20, 2026

(54) OPEN ROTOR AIRCRAFT PROPULSION SYSTEM WITH OFFSET GEARTRAIN

(71) Applicant: RTX Corporation, Farmington, CT (US)

(72) Inventors: Jeffrey T. Morton, Manchester, CT (US); Melissa Coombes, Orono, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/903,232

(22) Filed: Oct. 1, 2024

(65) Prior Publication Data

US 2026/0091880 A1 Apr. 2, 2026

(51) Int. Cl.

| | |
|---|---|
| ***B64D 33/02*** | (2006.01) |
| ***B64D 27/10*** | (2006.01) |
| ***B64D 35/02*** | (2006.01) |
| ***F02C 3/067*** | (2006.01) |
| ***F02C 3/107*** | (2006.01) |

(Continued)

(52) U.S. Cl.

CPC ............. *B64D 33/02* (2013.01); *B64D 27/10* (2013.01); *B64D 35/02* (2013.01); *F02C 3/067* (2013.01); *F02C 3/107* (2013.01); *F02C 7/04* (2013.01); *F02C 7/06* (2013.01); *F02C 7/36* (2013.01); *F05D 2260/4031* (2013.01)

(58) Field of Classification Search

CPC .. F02C 3/107; F02C 3/067; F02C 7/04; F02C 7/06; F02C 7/36; F02K 3/072; B64D 27/10; B64D 35/02; B64D 35/06; B64D 33/02; B64C 11/18; B64C 11/306

See application file for complete search history.

(56) References Cited

U.S. PATENT DOCUMENTS 4,569,199 A * 2/1986 Klees ...................... F02K 3/075 60/773
4,728,261 A 3/1988 Wright
(Continued)

FOREIGN PATENT DOCUMENTS

DE 102015209148 A1 10/2016
WO 2017109430 A1 6/2017

OTHER PUBLICATIONS

EP Search Report for EP Patent Application No. 25206184.1 dated Feb. 26, 2026.

*Primary Examiner* — Kyle Robert Thomas
(74) *Attorney, Agent, or Firm* — Getz Balich LLC

(57) ABSTRACT

An open propulsor rotor is configured to rotate about a first axis. An open guide vane structure includes a plurality of open guide vanes arranged circumferentially about a second axis offset from the first axis. The open guide vanes include a first open guide vane. A turbine engine includes a flowpath, a compressor section, a combustor section, a turbine section and a rotating assembly. The flowpath extends through the compressor section, the combustor section and the turbine section from an airflow inlet into the flowpath to a combustion products exhaust from the flowpath. The airflow inlet is axially aligned with or located forward of the first open guide vane along the second axis. The rotating assembly includes a turbine rotor disposed in the turbine section. The rotating assembly is configured to drive rotation of the open propulsor rotor through an offset geartrain.

15 Claims, 15 Drawing Sheets

(51) Int. Cl.

| | |
|---|---|
| ***F02C 7/04*** | (2006.01) |
| ***F02C 7/06*** | (2006.01) |
| ***F02C 7/36*** | (2006.01) |

(56) References Cited

U.S. PATENT DOCUMENTS

| | | | | |
|---|---|---|---|---|
| 4,765,135 | A | 8/1988 | Lardellier | |
| 4,936,748 | A | 6/1990 | Adamson | |
| 5,090,869 | A | 2/1992 | Wright | |
| 8,740,565 | B2 | 6/2014 | Perkinson | |
| 9,869,248 | B2 | 1/2018 | Suciu | |
| 10,202,941 | B2 | 2/2019 | Suciu | |
| 10,351,252 | B2 | 7/2019 | Reigner | |
| 10,584,641 | B2 * | 3/2020 | Escure | F02C 7/36 |
| 10,640,222 | B2 * | 5/2020 | El Ghannam | B64D 27/404 |
| 10,927,766 | B2 * | 2/2021 | El Ghannam | F02C 7/32 |
| 11,052,994 | B2 | 7/2021 | Charier | |
| 11,473,507 | B2 * | 10/2022 | Molesini | F01D 17/162 |
| 11,492,918 | B1 * | 11/2022 | Ostdiek | F02C 7/04 |
| 11,834,954 | B2 | 12/2023 | Ostdiek | |
| 12,000,344 | B2 * | 6/2024 | Levisse | F16H 1/28 |
| 12,017,751 | B2 * | 6/2024 | Miller | B64C 11/001 |
| 12,031,504 | B2 | 7/2024 | Miller | |
| 12,055,094 | B1 * | 8/2024 | Bowden | F02C 7/042 |
| 12,065,989 | B2 * | 8/2024 | Ostdiek | F02K 3/06 |
| 12,421,864 | B2 * | 9/2025 | Zutshi | F01D 17/162 |
| 2013/0315701 | A1 | 11/2013 | Neuteboom | |
| 2015/0291276 | A1 | 10/2015 | Zatorski | |
| 2021/0108597 | A1 | 4/2021 | Marion | |
| 2021/0231058 | A1 | 7/2021 | Plante | |
| 2022/0074349 | A1 | 3/2022 | Valois | |
| 2023/0085244 | A1 | 3/2023 | Miller | |
| 2024/0254923 | A1 * | 8/2024 | Fernandez | B64D 27/34 |

* cited by examiner

OPEN ROTOR AIRCRAFT PROPULSION SYSTEM WITH OFFSET GEARTRAIN

BACKGROUND OF THE DISCLOSURE

1. Technical Field

This disclosure relates generally to an aircraft and, more particularly, to propulsion system(s) for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft. This aircraft assembly includes an open propulsor rotor, an open guide vane structure, a turbine engine and a drivetrain. The open propulsor rotor is configured to rotate about a first axis. The open guide vane structure is disposed aft of the open propulsor rotor along the first axis. The open guide vane structure includes a plurality of open guide vanes arranged circumferentially about a second axis that is offset from the first axis. The open guide vanes include a first open guide vane. The turbine engine includes a flowpath, a compressor section, a combustor section, a turbine section and a rotating assembly. The flowpath extends through the compressor section, the combustor section and the turbine section from an airflow inlet into the flowpath to a combustion products exhaust from the flowpath. The airflow inlet is axially aligned with or located forward of the first open guide vane along the second axis. The rotating assembly includes a turbine rotor disposed in the turbine section. The rotating assembly is configured to rotate about the second axis. The drivetrain includes an offset geartrain. The rotating assembly is configured to drive rotation of the open propulsor rotor through the offset geartrain.

According to another aspect of the present disclosure, another assembly is provided for an aircraft. This aircraft assembly includes an open propulsor rotor, an open guide vane structure, a turbine engine and a drivetrain. The open propulsor rotor is configured to rotate about a first axis. The open guide vane structure is disposed aft of the open propulsor rotor along a second axis that is at least laterally offset from the first axis. The open guide vane structure includes a plurality of open guide vanes arranged circumferentially about the second axis. The open guide vanes include a first open guide vane. The turbine engine includes a flowpath, a compressor section, a combustor section, a turbine section and a rotating assembly. The flowpath extends through the compressor section, the combustor section and the turbine section from an airflow inlet into the flowpath to a combustion products exhaust from the flowpath. The airflow inlet includes a non-annular inlet opening wherein an inner end of the first open guide vane is circumferentially aligned with and radially outboard of the non-annular inlet opening. The rotating assembly includes a turbine rotor disposed in the turbine section. The rotating assembly is configured to rotate about the second axis. The drivetrain includes an offset geartrain. The rotating assembly is configured to drive rotation of the open propulsor rotor through the offset geartrain.

According to still another aspect of the present disclosure, another assembly is provided for an aircraft. This aircraft assembly includes an open propulsor rotor, an open guide vane structure, a turbine engine and a drivetrain. The open propulsor rotor is configured to rotate about a first axis. The open guide vane structure is disposed downstream of the open propulsor rotor along a second axis that is at least laterally offset from the first axis. The open guide vane structure includes a plurality of open guide vanes arranged and non-equispaced circumferentially about the second axis. The turbine engine includes a flowpath, a compressor section, a combustor section, a turbine section and a rotating assembly. The flowpath extends through the compressor section, the combustor section and the turbine section from an airflow inlet into the flowpath to a combustion products exhaust from the flowpath. The airflow inlet includes a non-annular inlet opening. The rotating assembly includes a turbine rotor disposed in the turbine section. The rotating assembly is configured to rotate about the second axis. The drivetrain includes an offset geartrain. The rotating assembly is configured to drive rotation of the open propulsor rotor through the offset geartrain.

The open guide vanes may include a second open guide vane that is circumferentially spaced from the non-annular inlet opening. A radial span of the first open guide vane may be smaller than a radial span of the second open guide vane.

The airflow inlet may be located axially along the first open guide vane between a leading edge plane and a trailing edge plane. The leading edge plane may be perpendicular to the second axis and may be located at a leading edge of the first open guide vane. The trailing edge plane may be perpendicular to the second axis and may be located at a trailing edge of the first open guide vane.

The airflow inlet may be located axially forward of the first open guide vane.

The airflow inlet may be located axially at an aft end of the open propulsor rotor along the second axis.

The airflow inlet may be non-annular.

The airflow inlet may include an inlet opening. The inlet opening may extend circumferentially about the second axis a number of degrees between opposing circumferential ends of the inlet opening. The number of degrees may be equal to or less than one-hundred and twenty degrees.

The airflow inlet may be formed collectively by a plurality of inlet openings arranged circumferentially about the second axis.

The open propulsor rotor may include a rotor base and a plurality of open propulsor blades arranged circumferentially about and connected to the rotor base. An inner peripheral boundary of the airflow inlet may be radially aligned with a radial exterior surface of the rotor base at an aft end of the open propulsor rotor.

The open propulsor rotor may include a rotor base and a plurality of open propulsor blades arranged circumferentially about and connected to the rotor base. An inner peripheral boundary of the airflow inlet may be spaced radially outboard from a radial exterior surface of the rotor base at an aft end of the open propulsor rotor.

A circumferentially neighboring pair of the open guide vanes may be circumferentially separated by an inter-vane gap. The inter-vane gap may extend circumferentially about the second axis a first number of degrees between the circumferentially neighboring pair of the open guide vanes. The airflow inlet may include an inlet opening. The inlet opening may be circumferentially aligned with the inter-vane gap. The inlet opening may extend circumferentially about the second axis a second number of degrees between opposing circumferential ends of the inlet opening. The second number of degrees may be equal to or less than the first number of degrees.

The airflow inlet may include an inlet opening. The inlet opening may be arranged circumferentially between a circumferentially neighboring pair of the open guide vanes.

The airflow inlet may include an inlet opening. The first open guide vane may be circumferentially aligned with the inlet opening.

The first open guide vane may be a fixed first open guide vane. The open guide vanes may include a second adjustable open guide vane that is circumferentially offset from the inlet opening.

The airflow inlet may include an inlet opening. An inner end of the first open guide vane may be disposed radially outboard of the inlet opening.

The airflow inlet may include a first inlet opening and a second inlet opening arranged circumferentially about the second axis. The first open guide vane may be aligned circumferentially between the first inlet opening and a second inlet opening about the second axis.

A first open rotor propulsion system may include the open propulsor rotor, the open guide vane structure, the turbine engine and the drivetrain. The rotating assembly may be configured to drive rotation of the open propulsor rotor through the offset geartrain in a first direction about the first axis. A second open rotor propulsion system may include a second open propulsor rotor, a second open guide vane structure, a second turbine engine and a second drivetrain. The second open propulsor rotor may be configured to rotate about a third axis. The second open guide vane structure may be disposed aft of the second open propulsor rotor along a fourth axis that is offset from the third axis. The second open guide vane structure may include a plurality of second open guide vanes arranged circumferentially about the fourth axis. The second open guide vanes may include a second open guide vane. The second turbine engine may include a second flowpath, a second compressor section, a second combustor section, a second turbine section and a second rotating assembly. The second flowpath may extend through the second compressor section, the second combustor section and the second turbine section from a second airflow inlet into the second flowpath to a second combustion products exhaust from the second flowpath. The second airflow inlet may be axially aligned with or located forward of the second open guide vane along the fourth axis. The second rotating assembly may include a second turbine rotor disposed in the second turbine section. The second rotating assembly may be configured to rotate about the fourth axis. The second drivetrain may include a second offset geartrain. The second rotating assembly may be configured to drive rotation of the second open propulsor rotor through the second offset geartrain in a second direction about the third axis. The second direction may be rotationally opposite the first direction.

The assembly may also include an aircraft fuselage arranged laterally between the first open rotor propulsion system and the second open rotor propulsion system.

Tips of at least some (or all) of the open guide vanes may be equispaced from the second axis.

Tips of at least some (or all) of the plurality of open guide vanes may be equispaced from the first axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
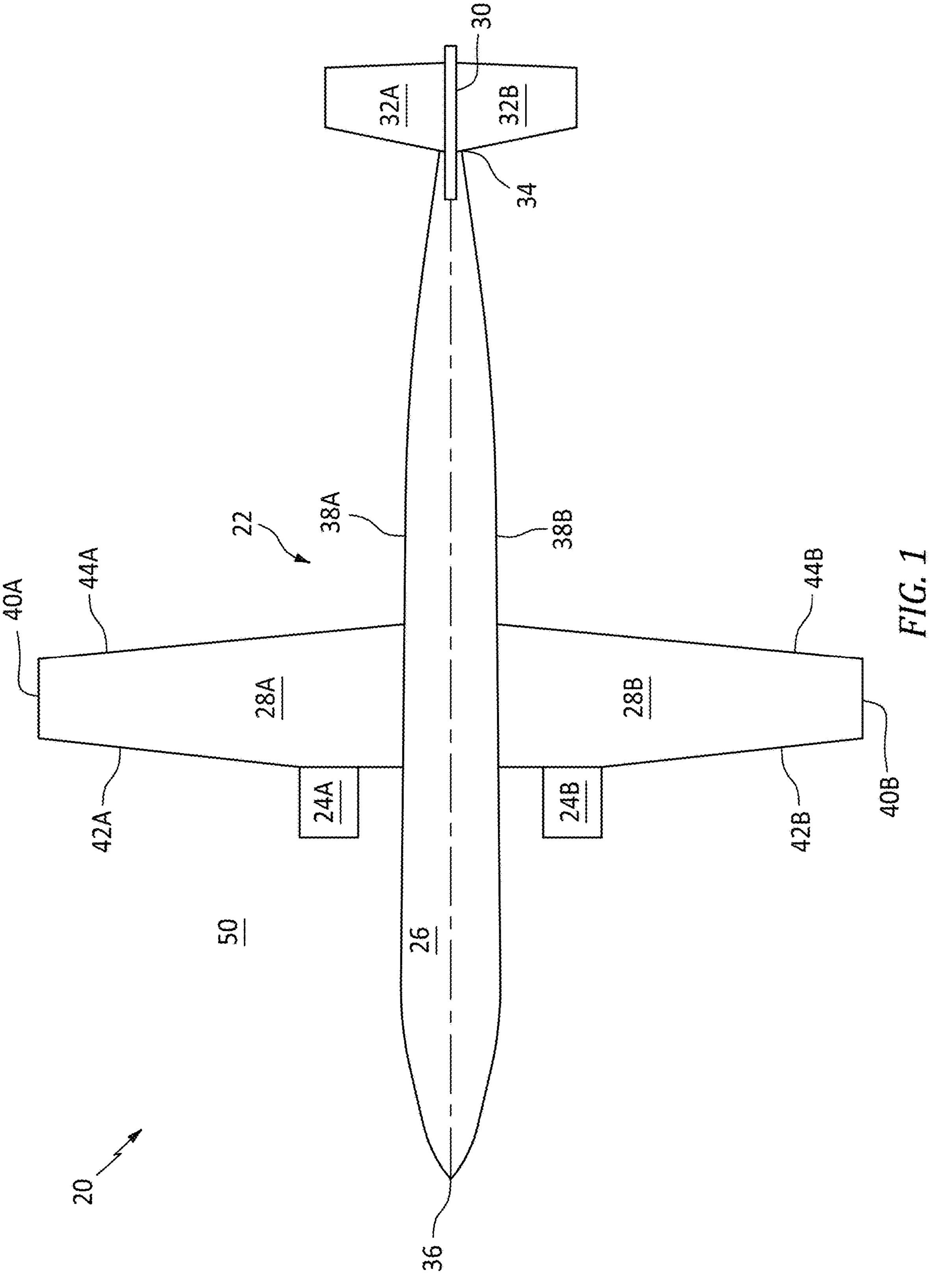
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B arranged at (e.g., on, adjacent or proximate) an aft, downstream tail end 34 of the aircraft fuselage 26. However, in other embodiments, it is contemplated one or more of the aircraft stabilizers 30, 32A and/or 32B may be omitted where, for example, the aircraft 20 is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A, 28B projects spanwise out from the aircraft fuselage 26 to a tip 40A, 40B of the respective aircraft wing 28A, 28B. Each of the aircraft wings 28A, 28B extends longitudinally between and to a leading edge 42A, 42B of the respective aircraft wing 28A, 28B and a trailing edge 44A, 44B of the respective aircraft wing 28A, 28B.

Figure 2:
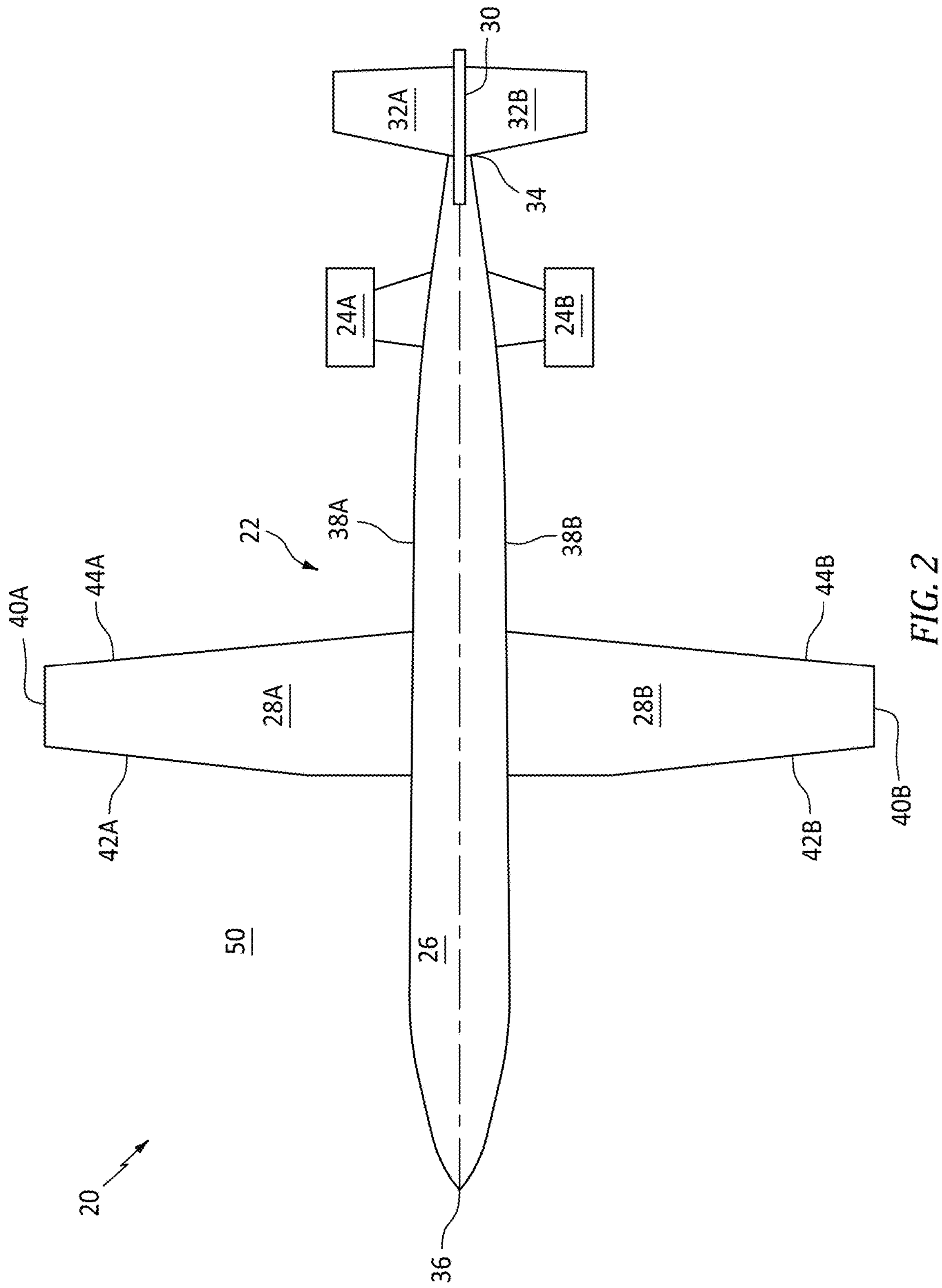
FIG. 2 is a schematic illustration of the aircraft with its propulsion systems mounted to a fuselage of the aircraft.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
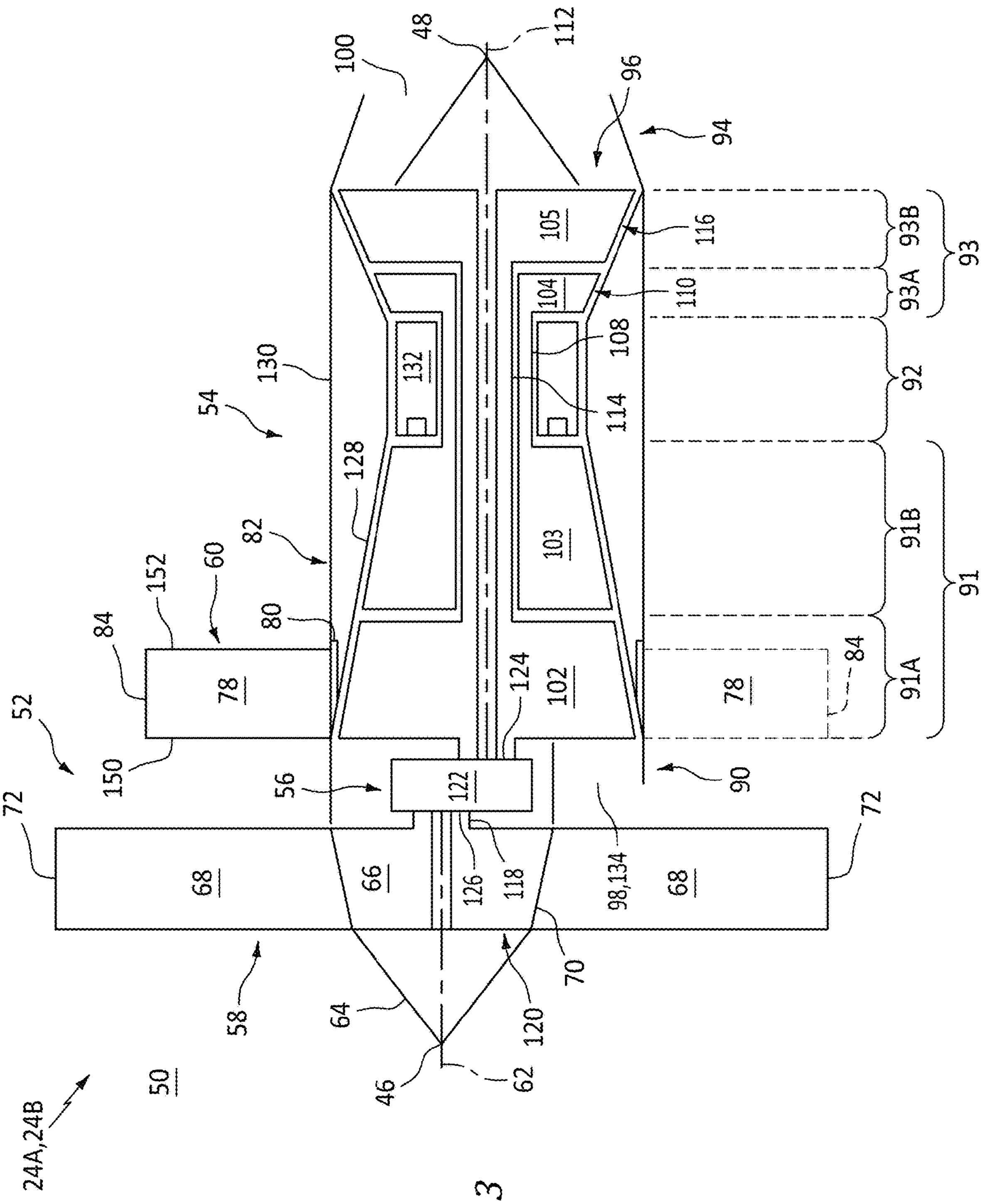
FIG. 3 is a schematic illustration of an exemplary one of the propulsion systems.

Referring to FIG. 3, each aircraft propulsion system 24A, 24B extends axially between an upstream, forward end 46 of the respective aircraft propulsion system 24 and a downstream, aft end 48 of the respective aircraft propulsion system 24. The aircraft propulsion system 24 of FIG. 3 is configured as an open rotor propulsion system; e.g., a single rotor and swirl recovery vane (SRV) open rotor propulsion system. Here, the term "open" may describe a propulsion system section and/or a propulsion system component which is open to an environment 50 (e.g., an ambient environment) external to the respective aircraft propulsion system 24 and, more generally, the aircraft 20 (see FIGS. 1 and 2). The aircraft propulsion system 24 of FIG. 3 includes an open rotor propulsion section 52 (e.g., a single rotor and swirl recovery vane (SRV) propulsion module), a turbine engine 54 and a drivetrain 56, where the turbine engine 54 is configured to power operation of the propulsion section 52 through the drivetrain 56.

The propulsion section 52 of FIG. 3 includes an open propulsor rotor 58 and an open guide vane structure 60 arranged axially along a centerline and/or rotational axis 62 of the propulsion section 52 and its members 58 and 60. These propulsion section members 58 and 60 are un-ducted and unshrouded components of the aircraft propulsion system 24 and its propulsion section 52. The propulsion section 52 of FIG. 3 also includes a nose cone 64 disposed at (e.g., on, adjacent or proximate) the propulsion system forward end 46. Briefly, this nose cone 64 may be configured as a spinner which is rotatable with the propulsor rotor 58 about the propulsor axis 62. Alternatively, the nose cone 64 may be configured as a stationary structure of the propulsion section 52.

Figure 4:
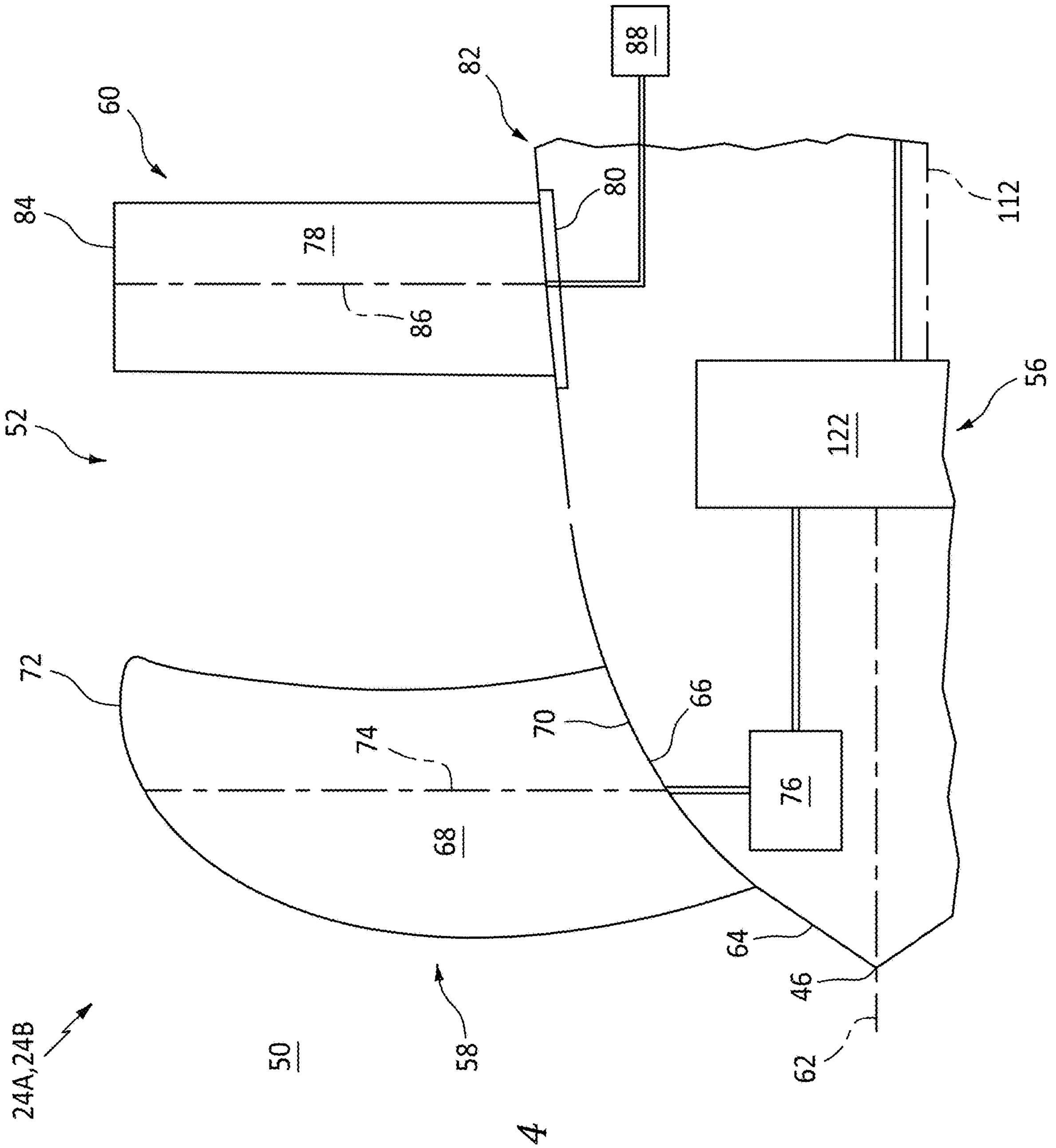
FIG. 4 is a schematic illustration of a forward portion of the propulsion system of FIG. 3.

Referring to FIG. 4, the propulsor rotor 58 includes a propulsor rotor base 66 (e.g., a disk or a hub) and a plurality of open propulsor blades 68 (e.g., airfoils). The propulsor blades 68 are arranged and may be equispaced circumferentially about the rotor base 66 and the propulsor axis 62 in an array; e.g., a circular array. Each of the propulsor blades 68 is connected to (e.g., formed integral with or otherwise attached to) the rotor base 66. Each of the propulsor blades 68 projects spanwise along a span line of the respective propulsor blade 68 (e.g., radially relative to the propulsor axis 62) out from an outer platform surface 70 of the rotor base 66, into the external environment 50, to an unshrouded distal tip 72 of the respective propulsor blade 68. Each propulsor blade 68 is thereby configured as an un-ducted and unshrouded propulsor blade which is exposed to (e.g., disposed in) the surrounding external environment 50.

Each propulsor blade 68 may be configured to pivot about a respective pivot axis 74. This blade pivot axis 74 extends radially relative to the propulsor axis 62. The blade pivot axis 74 of FIG. 4, for example, is arranged perpendicular to the propulsor axis 62 when viewed, for example, in a longitudinal reference plane parallel to (e.g., including) the propulsor axis 62; e.g., the plane of FIG. 4. Each propulsor blade 68 of FIG. 4 is operatively coupled with a blade actuation system 76 (schematically shown). This blade actuation system 76 is configured to pivot each propulsor blade 68 about its respective blade pivot axis 74. By pivoting each propulsor blade 68 about its blade pivot axis 74, a pitch of the respective propulsor blade 68 may be changed. Note, while the blade pivot axis 74 is shown in FIG. 4 as being perpendicular to the propulsor axis 62, it is contemplated this blade pivot axis 74 may or may not be coincident with the propulsor axis 62. Moreover, it is contemplated each blade pivot axis 74 may alternatively be angularly offset from the propulsor axis 62 by an acute angle or an obtuse angle when viewed, for example, in the longitudinal reference plane. Of course, it is contemplated some or all of the propulsor blades 68 may be alternatively moved to change the propulsor blade pitch. Moreover, it is contemplated some or all of the propulsor blades 68 may alternatively be fixed pitch propulsor blades.

The guide vane structure 60 of FIG. 4 includes a plurality of open exit guide vanes 78 (e.g., airfoils); e.g., see also FIGS. 5-8 and FIGS. 16-18. The guide vanes 78 are arranged and may or may not be equispaced circumferentially about the propulsor axis 62 in an array; e.g., an arcuate array (e.g., see FIGS. 5 and 7), a circular array (e.g., see FIGS. 6 and 8), etc. The guide vane structure 60 and its guide vanes 78 are arranged axially next to (e.g., adjacent) the propulsor rotor 58 and its propulsor blades 68. The guide vane structure 60 and its guide vanes 78 of FIG. 4, for example, are arranged downstream of the propulsor rotor 58 and its propulsor blades 68, without (e.g., any) other propulsor rotors or guide vane structures axially therebetween to propel and/or turn the air propelled by the propulsor rotor 58 to the guide vane structure 60 for example. Each of the guide vanes 78 of FIG. 4 is coupled to a support structure 80 of a housing 82 for the respective aircraft propulsion system 24. This support structure 80 may be a support frame, a case or another fixed structure of the propulsion system housing 82. Each of the guide vanes 78 projects spanwise along a span line of the respective guide vane 78 (e.g., radially relative to the propulsor axis 62) out from an exterior of the propulsion system housing 82, into the external environment 50, to an unshrouded distal tip 84 of the respective guide vane 78. Each guide vane 78 is thereby configured as an un-ducted and unshrouded guide vane which is exposed to (e.g., disposed in) the surrounding external environment 50.

Each guide vane 78 may be configured to pivot about a respective pivot axis 86. This vane pivot axis 86 extends radially relative to the propulsor axis 62. The vane pivot axis 86 of FIG. 4, for example, is arranged perpendicular to the propulsor axis 62 when viewed, for example, in the longitudinal reference plane. Each guide vane 78 of FIG. 4 is operatively coupled with a vane actuation system 88 (schematically shown), which vane actuation system 88 may be discrete from or integrated as part of the blade actuation system 76. The vane actuation system 88 is configured to pivot each guide vane 78 about its vane pivot axis 86. By pivoting each guide vane 78 about its vane pivot axis 86, a pitch of the respective guide vane 78 may be changed. Note, while the vane pivot axis 86 is shown in FIG. 4 as being perpendicular to the propulsor axis 62, it is contemplated this vane pivot axis 86 may or may not be coincident with the propulsor axis 62. Moreover, it is contemplated each vane pivot axis 86 may alternatively be angularly offset from the propulsor axis 62 by an acute angle or an obtuse angle when viewed, for example, in the longitudinal reference plane. Of course, it is contemplated some or all of the guide vanes 78 may be alternatively moved to change the guide vane pitch. Moreover, it is contemplated some or all of the guide vanes 78 may alternatively be configured as fixed pitch guide vanes.

Referring to FIG. 3, the turbine engine 54 includes an inlet section 90, a compressor section 91, a combustor section 92, a turbine section 93 and an exhaust section 94.

The compressor section 91 of FIG. 3 includes a low pressure compressor (LPC) section 91A and a high pressure compressor (HPC) section 91B. The turbine section 93 of FIG. 3 includes a high pressure turbine (HPT) section 93A and a low pressure turbine (LPT) section 93B. The turbine engine 54 also includes an engine flowpath 96 which extends longitudinally through the aircraft propulsion system 24 of FIG. 3 and its turbine engine 54 from an airflow inlet 98 into the engine flowpath 96 to a combustion products exhaust 100 from the engine flowpath 96. Here, the flowpath inlet 98 is also an airflow inlet into the aircraft propulsion system 24 of FIG. 3 and its turbine engine 54. The flowpath exhaust 100 is also a combustion products exhaust from the aircraft propulsion system 24 of FIG. 3 and its turbine engine 54.

Each of the engine sections 91A, 91B, 93A and 93B includes a respective bladed rotor 102-105; e.g., a ducted and/or shrouded engine rotor. Each of these engine rotors 102-105 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 96. Each of the rotor blades is connected to the respective rotor base. Each of the rotor blades projects radially (e.g., spanwise) out from the respective rotor base into the engine flowpath 96 and to a distal tip of the respective rotor blade.

The HPC rotor 103 is coupled to and rotatable with the HPT rotor 104. The HPC rotor 103 of FIG. 3, for example, is connected to the HPT rotor 104 by a high speed shaft 108. At least (or only) the HPC rotor 103, the HPT rotor 104 and the high speed shaft 108 collectively form a high speed rotating assembly 110; e.g., a high speed spool of a core (e.g., a gas generator) of the turbine engine 54. This high speed rotating assembly 110 of FIG. 3 and its members 103, 104 and 108 are rotatable about a centerline and/or rotational axis 112 of the turbine engine 54 and/or its members 102-105. This engine axis 112 may be offset from the propulsor axis 62. The engine axis 112 of FIG. 3, for example, is laterally offset from the propulsor axis 62. More particularly, the engine axis 112 of FIG. 3 is spaced radially outboard from/to a side of the propulsor axis 62. Here, the engine axis 112 is arranged parallel with the propulsor axis 62. However, it is contemplated the engine axis 112 may also or alternatively be angularly offset from the propulsor axis 62 by, for example, a non-zero acute angle.

The LPC rotor 102 is coupled to and rotatable with the LPT rotor 105. The LPC rotor 102 of FIG. 3, for example, is connected to the LPT rotor 105 by a low speed shaft 114. At least (or only) the LPC rotor 102, the LPT rotor 105 and the low speed shaft 114 collectively form a low speed rotating assembly 116; e.g., a low speed spool of the turbine engine 54 and its engine core. This low speed rotating assembly 116 of FIG. 3 and its members 102, 105 and 114 are rotatable about the engine axis 112.

The propulsor rotor 58 is connected to and rotatable with a propulsor shaft 118. At least (or only) the propulsor rotor 58 and the propulsor shaft 118 collectively form a propulsor rotating assembly 120. This propulsor rotating assembly 120 of FIG. 3 and its members 58 and 118 are rotatable about the propulsor axis 62. The propulsor rotating assembly 120 is coupled to the low speed rotating assembly 116 through the drivetrain 56.

The drivetrain 56 of FIG. 3 includes an offset geartrain 122; e.g., a transmission, a speed change device, a gearbox, etc. This offset geartrain 122 is configured with a power input 124 and a power output 126. The power input 124 is operatively coupled to the low speed rotating assembly 116. The power output 126 is operatively coupled to the propulsor rotating assembly 120. Here, the power output 126 is offset from the power input 124 to facilitate the operative coupling between the low speed rotating assembly 116 which rotates about the engine axis 112 and the propulsor rotating assembly 120 which rotates about the propulsor axis 62. A gear system within the offset geartrain 122 may be configured such that the propulsor rotor 58 may rotate at a different (e.g., slower) rotational speed than the low speed rotating assembly 116 and its LPT rotor 105. The gear system may also or alternatively be configured such that the propulsor rotor 58 may rotate with the low speed rotating assembly 116 and its LPT rotor 105 in a common (the same) rotational direction or in different (e.g., opposing) rotational directions.

The engine sections 91A-93B may be arranged sequentially along the engine axis 112 and are housed within the propulsion system housing 82. This propulsion system housing 82 includes a core case 128 (e.g., a gas generator case) and a nacelle 130. The core case 128 houses one or more of the engine sections 91A-93B; e.g., the engine core. The core case 128 of FIG. 3, for example, extends axially along (e.g., axially overlaps) and extends circumferentially about (e.g., circumscribes) the engine sections 91A-93B and their respective bladed rotors 102-105. The core case 128 may also house the offset geartrain 122. The nacelle 130 houses and provides an aerodynamic cover over the core case 128. An exterior wall of the nacelle 130 of FIG. 3, for example, is disposed radially outboard of, extends axially along (e.g., axially overlaps) and extends circumferentially about (e.g., circumscribes) the engine core and its core case 128. With this arrangement, the bladed rotors 102-105 are disposed within the propulsion system housing 82. The propulsor rotor 58 and the guide vane structure 60 and its guide vanes 78 are disposed at least partially (or completely) outside of the propulsion system housing 82.

During operation of the aircraft propulsion system 24 of FIG. 3, ambient air within the external environment 50 is propelled by the propulsor rotor 58 in an aft, downstream direction towards the propulsion system aft end 48; e.g., left-to-right in FIG. 3. A major portion (e.g., more than 50%) of this air bypasses the turbine engine 54 to provide forward thrust while a minor portion (e.g., less than 50%) of the air flows into the turbine engine 54. For example, an outer stream of the air propelled by the propulsor rotor 58 flows axially across the guide vane structure 60 and outside of the propulsion system housing 82; e.g., along an exterior of the nacelle wall. The guide vane structure 60 is configured to condition (e.g., straighten out) the air propelled by the propulsor rotor 58, for example, to remove or reduce circumferential swirl and thereby enhance the forward thrust. An inner stream of the air propelled by the propulsor rotor 58 enters the turbine engine 54 and its engine flowpath 96 through the flowpath inlet 98. The air entering the engine flowpath 96 through the flowpath inlet 98 may be referred to as "core air".

The core air is compressed by the LPC rotor 102 and the HPC rotor 103 and directed into a combustion chamber 132 (e.g., an annular combustion chamber) of a combustor (e.g., an annular combustor) in the combustor section 92. Fuel is injected into the combustion chamber 132 by one or more fuel injectors and mixed with the compressed core air to provide a fuel-air mixture. This fuel-air mixture is ignited and combustion products thereof flow through and sequentially drive rotation of the HPT rotor 104 and the LPT rotor 105. The rotation of the HPT rotor 104 and the LPT rotor 105 respectively drive rotation of the HPC rotor 103 and the LPC rotor 102 and, thus, compression of the core air. The rotation of the LPT rotor 105 also drives rotation of the propulsor rotor 58 through the drivetrain 56 and its offset geartrain 122. The rotation of the propulsor rotor 58, in turn, propels the ambient air within the external environment 50 in the aft, downstream direction. With this arrangement, the turbine engine 54 and its low speed rotating assembly 116 power operation of (e.g., drives rotation of) the propulsor rotor 58 during aircraft propulsion system operation.

The engine flowpath 96 extends longitudinally from the flowpath inlet 98, sequentially through the inlet section 90, the LPC section 91A, the HPC section 91B, the combustor section 92, the HPT section 93A, the LPT section 93B and the exhaust section 94, to the flowpath exhaust 100. The engine flowpath 96 of FIG. 3 is configured such that the core air and the combustion products generally flow in the aft, downstream direction towards the propulsion system aft end 48. The core air and the combustion products thereby flow along with the ambient air propelled by the propulsor rotor 58 in a common axial direction—the aft, downstream direction. The turbine engine 54 of the present disclosure, however, is not limited to such an exemplary common flow engine arrangement. For example, the engine flowpath 96 may alternatively be configured such that the core air and the combustion products generally flow in a forward, upstream direction towards the propulsion system forward end 46. The core air and the combustion products may thereby flow in an opposite direction as the ambient air propelled by the propulsor rotor 58. Here, the turbine engine 54 may have a reverse flow engine arrangement. Moreover, while the turbine engine 54 is described above with the two engine rotating assemblies 110 and 116, the turbine engine 54 may alternatively include more than two engine rotating assemblies. The turbine engine 54, for example, may include a power turbine (PT) rotor configured to drive rotation of the propulsor rotor 58 independent of the any compressor rotor. In another example, the low speed rotating assembly 116 may be configured as a power turbine (PT) rotating assembly and the LPC rotor 102 may be omitted. In still another example, the high speed rotating assembly 110 may be omitted to configure the turbine engine 54 as a single rotating assembly turbine engine.

Figure 9A:
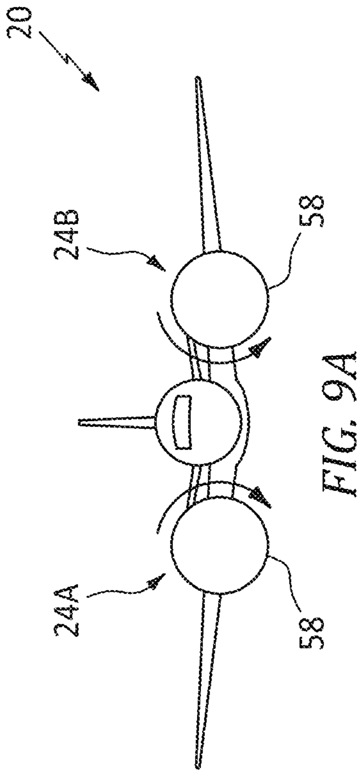
FIGS. 9A and 9B are front view illustrations of the aircraft depicting various symmetric propulsor rotating patterns.
Figure 9B:
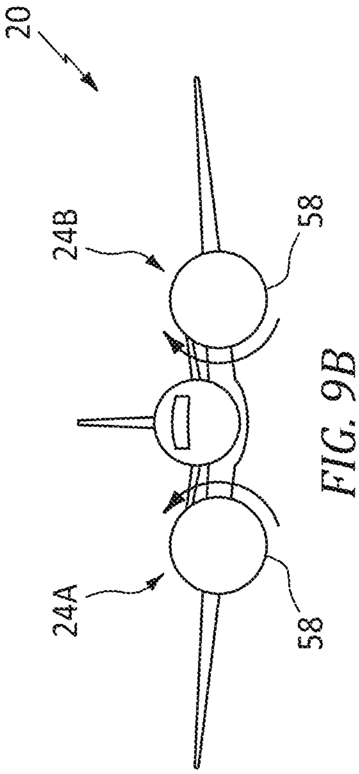
Figure 10:
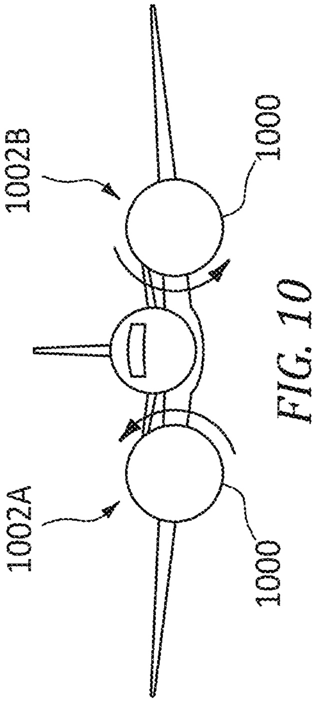
FIG. 10 is a front view illustration of an aircraft depicting an asymmetric propulsor rotating pattern.

The offset geartrain 122 of the first aircraft propulsion system 24A may be configured such that the low speed rotating assembly 116 and the propulsor rotating assembly 120 are counter-rotating structures. The low speed rotating assembly 116 and its members 102, 105 and 114 of the first aircraft propulsion system 24A, for example, are configured to rotate in a first direction (e.g., clockwise or counterclockwise) about its respective engine axis 112. The propulsor rotating assembly 120 and its members 58 and 118 of the first aircraft propulsion system 24A are configured to rotate in a second direction (e.g., counterclockwise or clockwise) about its respective propulsor axis 62, which second direction is rotationally opposite the first direction. By contrast, the offset geartrain 122 of the second aircraft propulsion system 24B may be configured such that the low speed rotating assembly 116 and the propulsor rotating assembly 120 are co-rotating structures. The low speed rotating assembly 116 and its members 102, 105 and 114 of the second aircraft propulsion system 24B, for example, are configured to rotate in the first direction about its respective engine axis 112. The propulsor rotating assembly 120 and its members 58 and 118 of the second aircraft propulsion system 24B are configured to rotate in the first direction about its respective propulsor axis 62. Referring to FIGS. 9A and 9B, the propulsor rotor 58 of the first aircraft propulsion system 24A and the propulsor rotor 58 of the second aircraft propulsion system 24B thereby rotate in different directions during aircraft flight. In FIG. 9A, the propulsor rotors 58 of the aircraft propulsion systems 24A and 24B rotate in an inboard down-down symmetric rotating pattern. In FIG. 9B, the propulsor rotors 58 of the aircraft propulsion systems 24A and 24B rotate in an inboard up-up symmetric rotating pattern. Such symmetric rotating patterns may facilitate a reduction in propulsion system noise, an increase in propulsion system performance, provision of symmetric control surface geometries, etc. By contrast, FIG. 10 illustrates propulsor rotors 1000 of right and left side aircraft propulsion systems 1002A and 1002B rotating in an asymmetric rotating pattern.

Typically, to facilitate a symmetric rotating pattern in companion open rotor and inline gearbox engines, prior art companion engines may be configured with different engine cores. For example, a low speed rotating assembly in one companion engine may be configured to rotate in the first direction whereas a low speed rotating assembly in the other companion engine may be configured to rotate in the second direction. Such an arrangement, however, may lead to duplication of research and development efforts for the two different engine cores and/or increased manufacturing costs. Moreover, to maintain a supply of spare parts, two separate supplies of spare parts may be maintained, one for each engine core configuration. By contrast, the aircraft propulsion systems 24 of the present disclosure may be provided with different offset geartrain configurations (e.g., by changing and/or including a layshaft) to facilitate the symmetric rotating patterns described above. Of course, it is contemplated the rotating patterns of the first aircraft propulsion system 24A and the second aircraft propulsion system 24B may be reversed in other embodiments.

Figure 5:
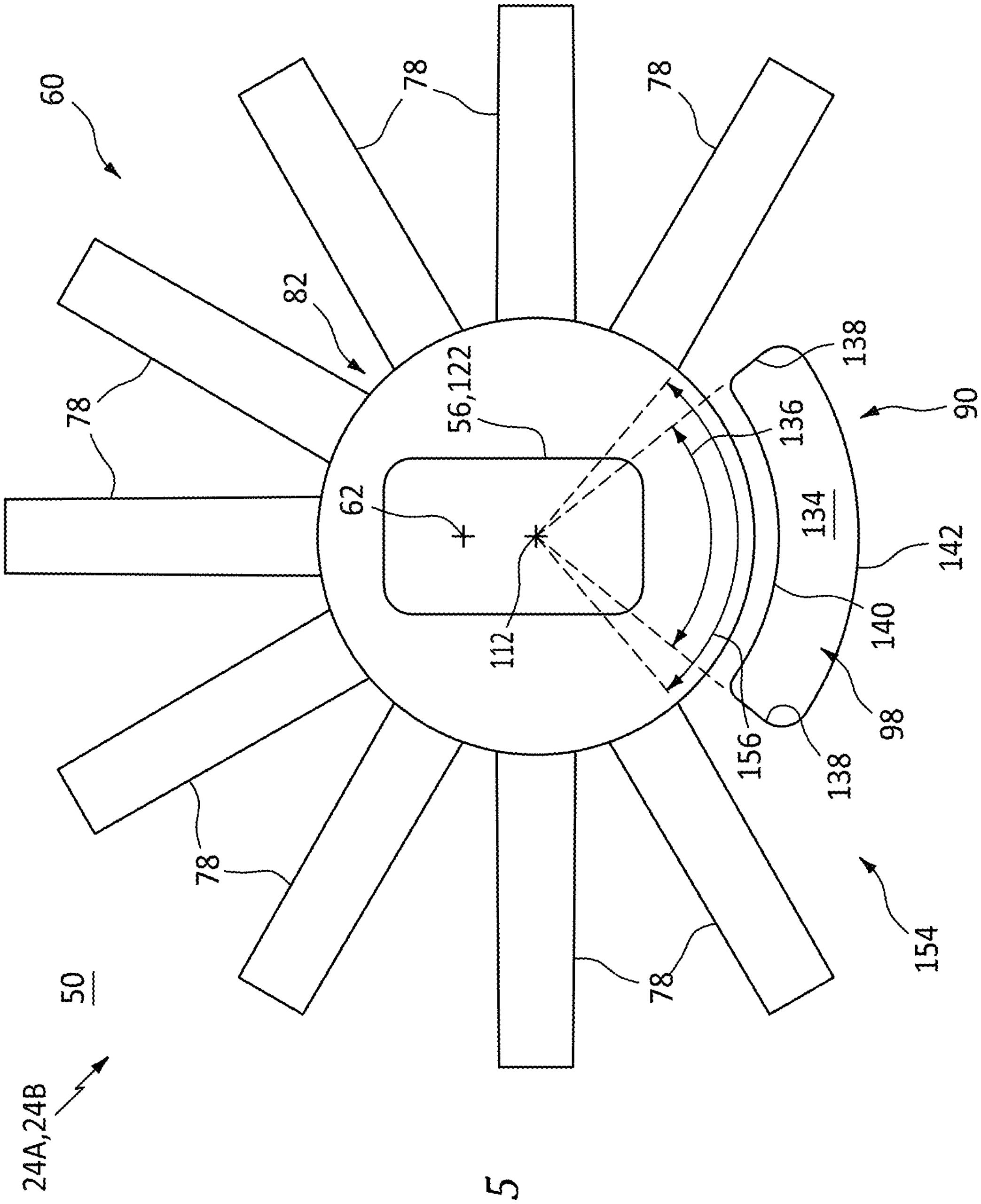
FIGS. 5-8 are partial schematic cross-sectional illustrations of an exemplary one of the propulsion systems with various inlet section arrangements.
Figure 6:
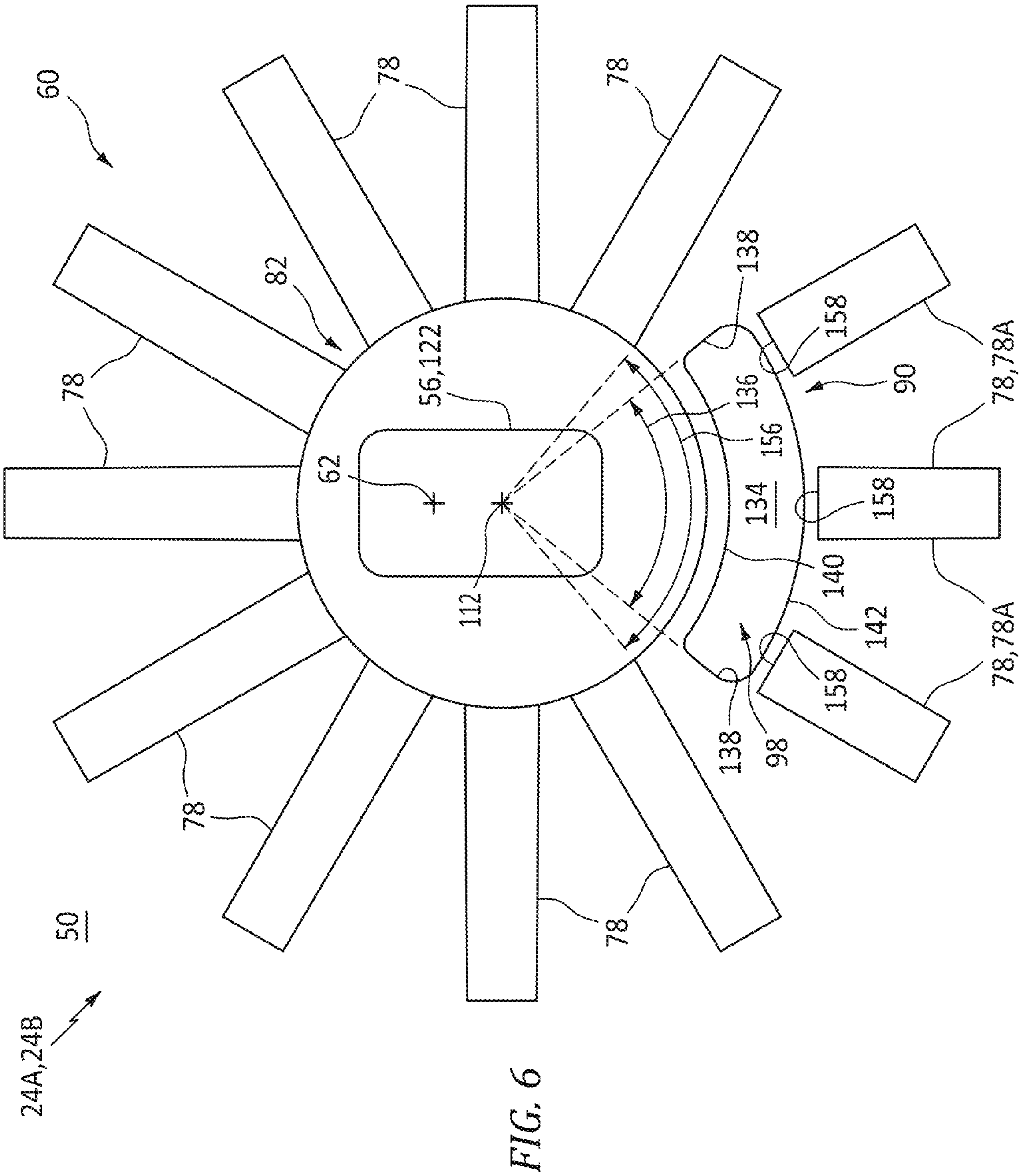
Figure 7:
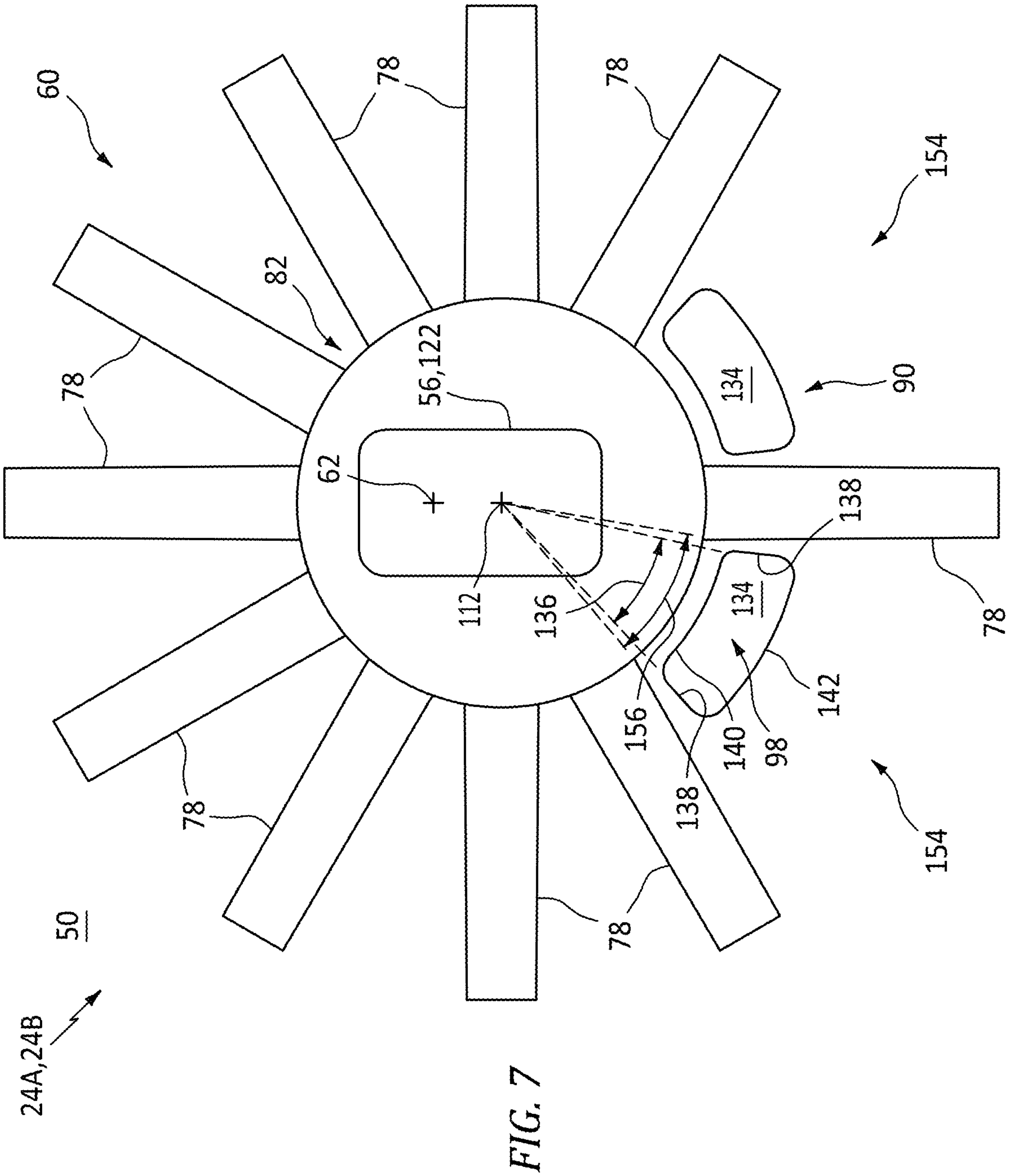
Figure 8:
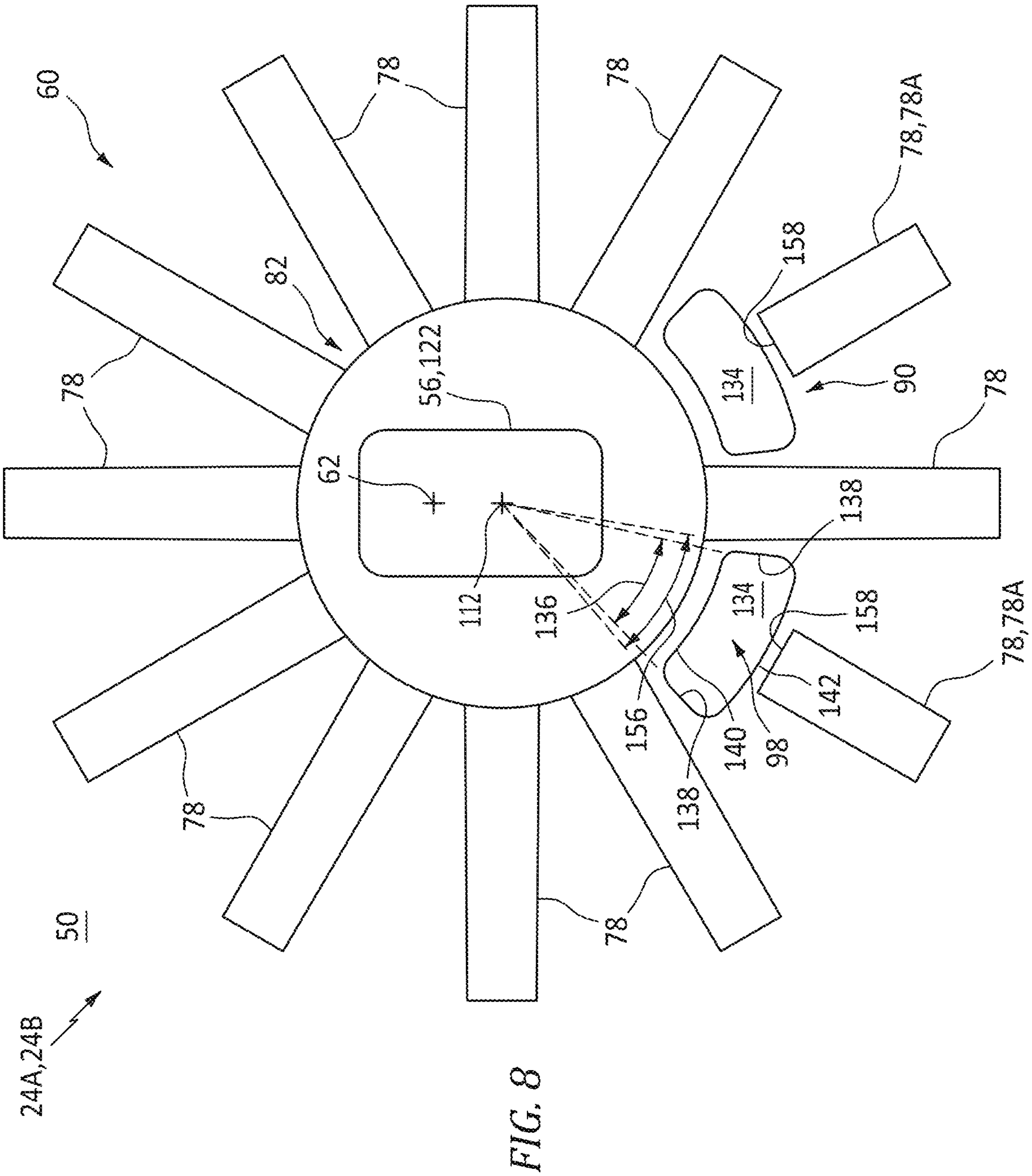

To facilitate the provision of the offset geartrain 122 of FIG. 3, the flowpath inlet 98 is provided with a non-annular (e.g., an arcuate) configuration as shown, for example, in FIGS. 5-8. In FIGS. 5 and 6, the flowpath inlet 98 includes and is formed by a single inlet opening 134 into the propulsion system housing 82. By contrast, in FIGS. 7 and 8, the flowpath inlet 98 includes and is collectively formed by multiple of the inlet openings 134 into the propulsion system housing 82. These inlet openings 134 of FIGS. 7 and 8 are arranged at discrete locations circumferentially about the propulsor axis 62 in an arcuate array. In FIGS. 5-8, the flowpath inlet 98 and its inlet opening(s) 134 are laterally offset to a common side of the propulsor axis 62 as the turbine engine 54 (see FIG. 3). Note, while the flowpath inlet 98 of FIGS. 3 and 5-8 and the turbine engine 54 of FIG. 3 are shown as being laterally offset to a vertical bottom side (e.g., relative to a direction of gravity) of the propulsor axis 62, it is contemplated the flowpath inlet 98 and/or the turbine engine 54 may alternatively be laterally offset to a vertical top side of the propulsor axis 62, a left side of the propulsor axis 62 or a right side of the propulsor axis 62, or anywhere there in-between.

Each inlet opening 134 of FIGS. 5-8 extends circumferentially about the propulsor axis 62 a certain number of degrees 136 between opposing circumferential ends 138 of that respective inlet opening 134. In FIGS. 5 and 6, the opening number of degrees 136 may be equal to or less than one-hundred and twenty degrees (120°) or ninety degrees (90°); e.g., between sixty degrees (60°) and twenty degrees (20°) inclusive. By contrast, in FIGS. 7 and 8, the opening number of degrees 136 may be equal to or less than ninety degrees (90°) or sixty degrees (60°); e.g., between forty degrees (40°) and five degrees (5°) inclusive. The present disclosure, however is not limited to the foregoing exemplary numbers of degrees particularly where an aspect ratio of each inlet opening 134 is varied.

Figure 12:
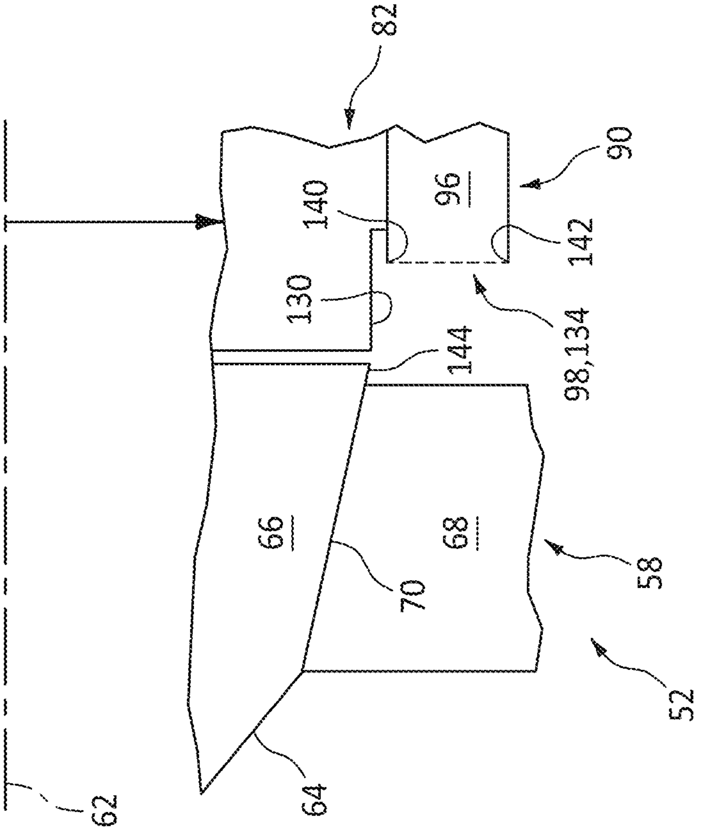
FIGS. 11 and 12 are partial schematic sectional illustrations of an exemplary one of the propulsion systems with various radially offset airflow inlet arrangements.
Figure 11:
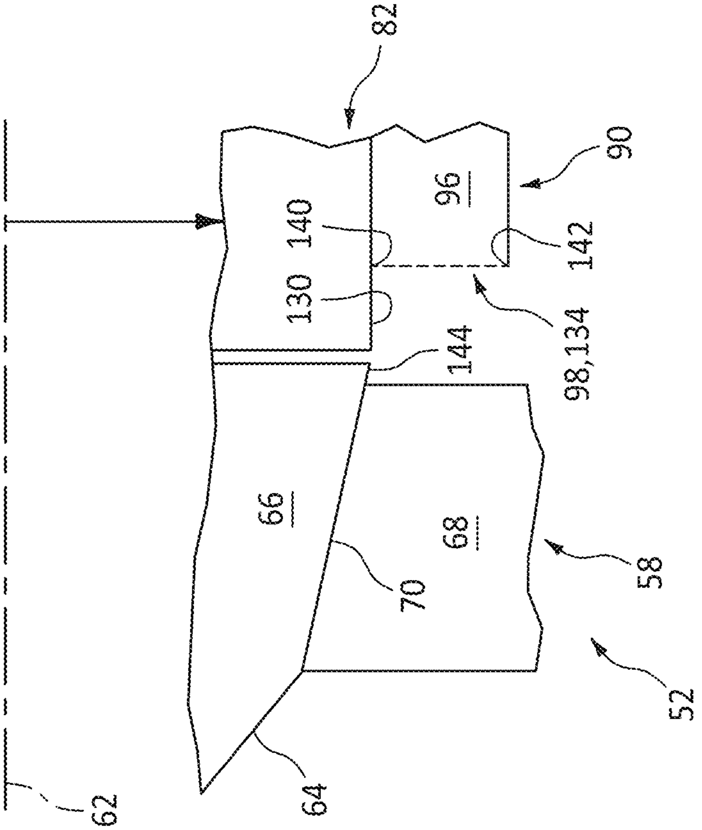

Each inlet opening 134 of FIGS. 5-8 extends radially out from a radial inner side 140 of the respective inlet opening 134 to a radial outer side 142 of the respective inlet opening 134. Here, the opening inner side 140 forms a radial inner peripheral boundary of the flowpath inlet 98 and the respective inlet opening 134. The opening outer side 142 forms a radial outer peripheral boundary of the flowpath inlet 98 and the respective inlet opening 134. In some embodiments, referring to FIG. 11, the opening inner side 140 may be radially aligned with (e.g., substantially flush with) the outer platform surface 70 at an axial downstream, aft end 144 of the propulsor rotor 58 and its rotor base 66. In other embodiments, referring to FIG. 12, the opening inner side 140 may be radially offset from (e.g., spaced radially outboard of) the outer platform surface 70 at the axial downstream, aft end 144 of the propulsor rotor 58 and its rotor base 66. With such an arrangement, turbulent boundary layer flow may be directed away from the flowpath inlet 98 and its respective inlet opening 134.

Figure 14:
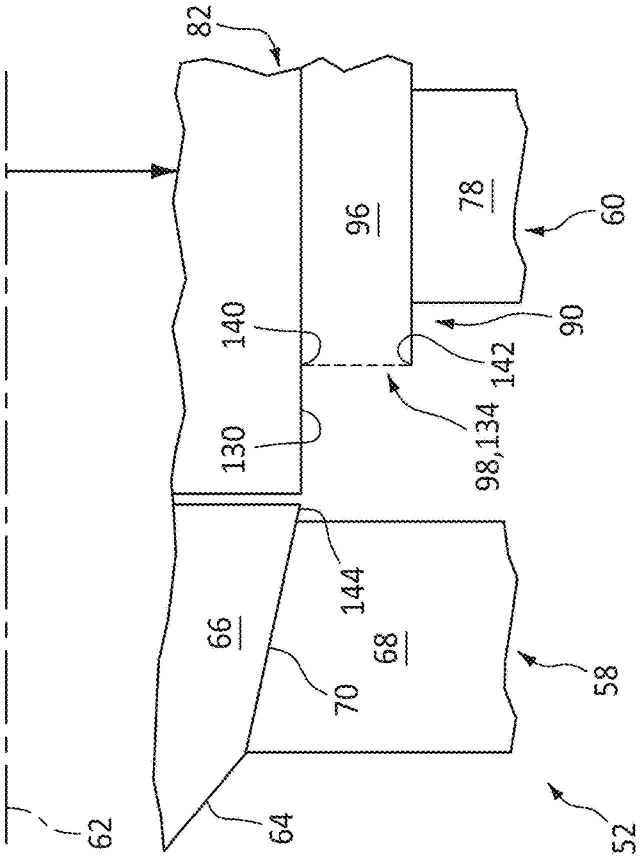
FIGS. 13-15 are partial schematic sectional illustrations of an exemplary one of the propulsion systems with various axially offset airflow inlet arrangements.
Figure 13:
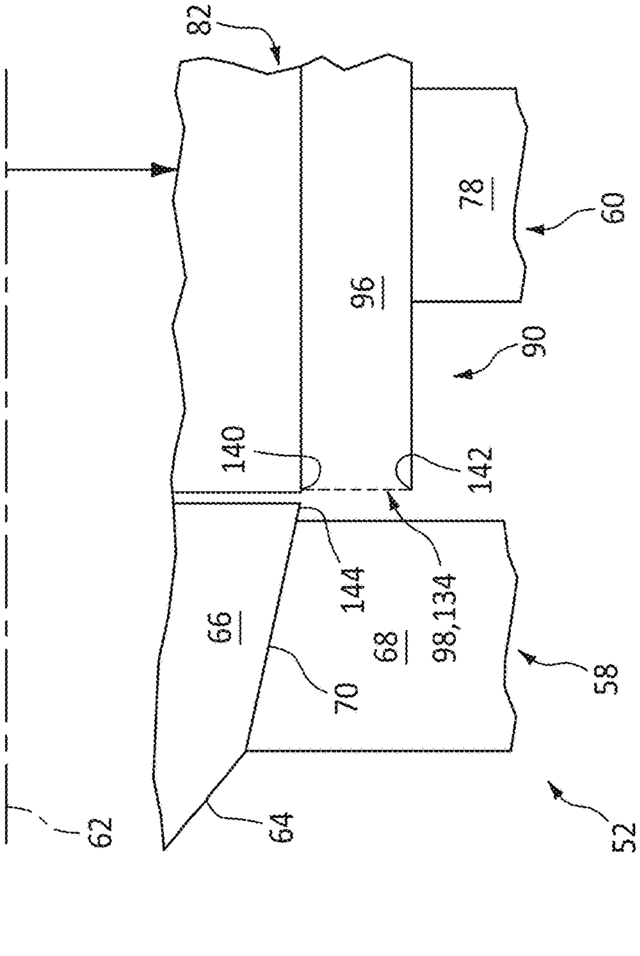

In some embodiments, referring to FIGS. 13 and 14, the inlet section 90 may be configured such that the flowpath inlet 98 and its inlet opening(s) 134 are axially forward and upstream of (relative to flow outside of the respective aircraft propulsion system 24) the guide vane structure 60 and its guide vanes 78. The flowpath inlet 98 of FIGS. 13 and 14, for example, is disposed at a location axially along the propulsor axis 62 between (a) the propulsor rotor 58 and its propulsor blades 68 and (b) the guide vane structure 60 and its guide vanes 78. In some embodiments, referring to FIG. 13, the flowpath inlet 98 may be disposed at (or about) the axial downstream, aft end 144 of the propulsor rotor 58 and its rotor base 66. In other embodiments, referring to FIG. 14, the flowpath inlet 98 may be axially setback from the axial downstream, aft end 144 of the propulsor rotor 58 and its rotor base 66.

Figure 15:
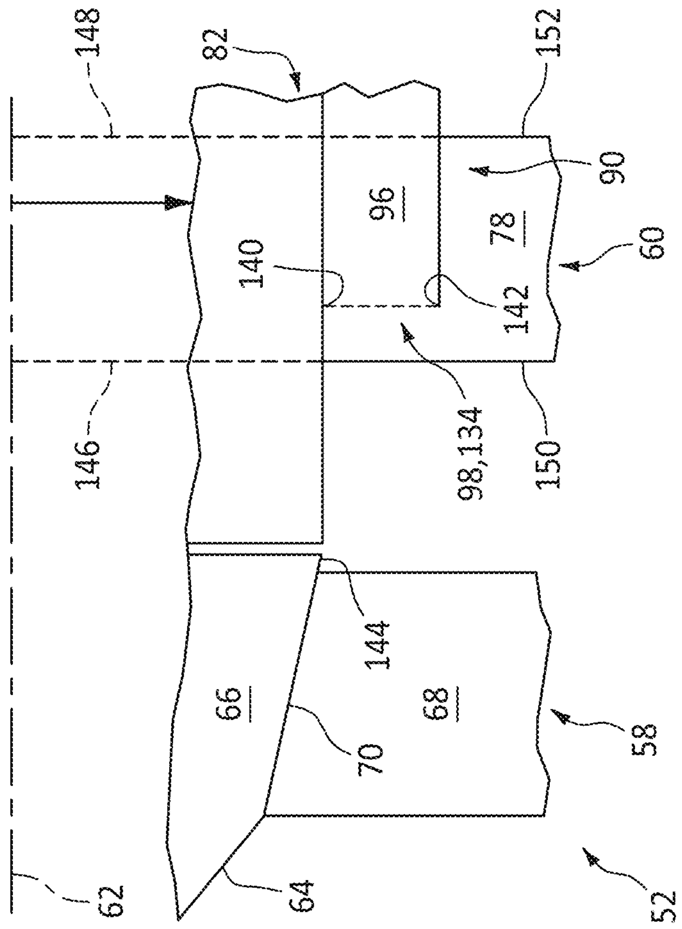

In some embodiments, referring to FIG. 15, the inlet section 90 may be configured such that the flowpath inlet 98 and its inlet opening(s) 134 are axially aligned with the guide vane structure 60 and its guide vanes 78. The flowpath inlet 98 of FIG. 15, for example, is disposed at a location axially along the propulsor axis 62 between a leading edge plane 146 of the guide vane(s) 78 and a trailing edge plane 148 of the guide vane(s) 78 inclusive. The leading edge plane 146 is perpendicular to the propulsor axis 62 and is disposed at (e.g., a forwardmost) location along a leading edge 150 of one or more of the guide vanes 78. The trailing edge plane 148 is perpendicular to the propulsor axis 62 and is disposed at (e.g., an aftmost) location along a trailing edge 152 of one or more of the guide vanes 78.

In some embodiments, referring to FIGS. 5 and 7, each inlet opening 134 may be circumferentially aligned with an inter-vane gap 154. This inter-vane gap 154 is formed by and extends circumferentially between a respective circumferentially neighboring (e.g., adjacent) pair of the guide vanes 78. The inter-vane gap 154, for example, extends circumferentially about the propulsor axis 62 a certain number of degrees 156 between the circumferentially neighboring pair of the guide vanes 78. The inter-vane gap 154 thereby circumferentially separates the circumferentially neighboring pair of the guide vanes 78. In FIGS. 5 and 7, the gap number of degrees 156 is sized equal to or greater than the opening number of degrees 136. Each inlet opening 134 may thereby be disposed within a respective inter-vane gap 154 between the respective circumferentially neighboring pair of the guide vanes 78. With the arrangement of FIGS. 5 and 7, the guide vanes 78 are asymmetrically spaced (e.g., non-equispaced) circumferentially about the propulsor axis 62 in a circumferential asymmetric pattern. Space may thereby be made for the inlet opening(s) 134 of FIGS. 5 and 7 by selectively omitting one or more guide vanes about the propulsor axis 62. Of course, in other embodiments, none of the guide vanes may be omitted, and each inlet opening 134 may be aligned and disposed between a respective pair of the guide vanes in an equispaced array.

In some embodiments, referring to FIGS. 6 and 8, each inlet opening 134 may be circumferentially aligned with a respective one or more of the guide vanes 78. For example, an inner end 158 of a respective guide vane 78 (e.g., 78A) may be disposed circumferentially and axially along as well as radially outboard of the respective inlet opening 134. More particularly, the respective guide vane 78 may be mounted with the propulsion system housing 82 at the opening outer side 142. With the arrangement of FIGS. 6 and 8, the guide vanes 78 may be symmetrically spaced (e.g., equispaced) circumferentially about the propulsor axis 62 in a circumferential symmetric pattern. However, since the guide vane(s) 78 circumferentially aligned with a respective inlet opening 134 is/are disposed radially outboard of that inlet opening 134, the guide vane(s) 78 that is/are circumferentially aligned with a respective inlet opening 134 does not/do not block or otherwise impede airflow to the respective inlet opening 134. In the specific pattern of FIG. 8, a single one of the guide vanes 78 is aligned and disposed circumferentially between the inlet openings 134.

In some embodiments, referring to FIGS. 6 and 8, each respective guide vane 78A circumferentially aligned with a respective inlet opening 134 may be configured as a fixed guide vane, while the remaining guide vanes 78 may (or may not) be configured as adjustable guide vanes. However, it is contemplated each respective guide vane 78A circumferentially aligned with a respective inlet opening 134 may alternatively be configured as an adjustable guide vane. In such arrangements, a (e.g., cylindrical or airfoil-shaped) spar may extend across the airflow inlet 98 to facilitate pivoting and/or other movement of the respective guide vane 78A.

In some embodiments, referring to FIGS. 6 and 8, each respective guide vane 78A circumferentially aligned with a respective inlet opening 134 may be configured with a radial span that is smaller than (e.g., common) radial spans of the remaining guide vanes 78.

Figure 16:
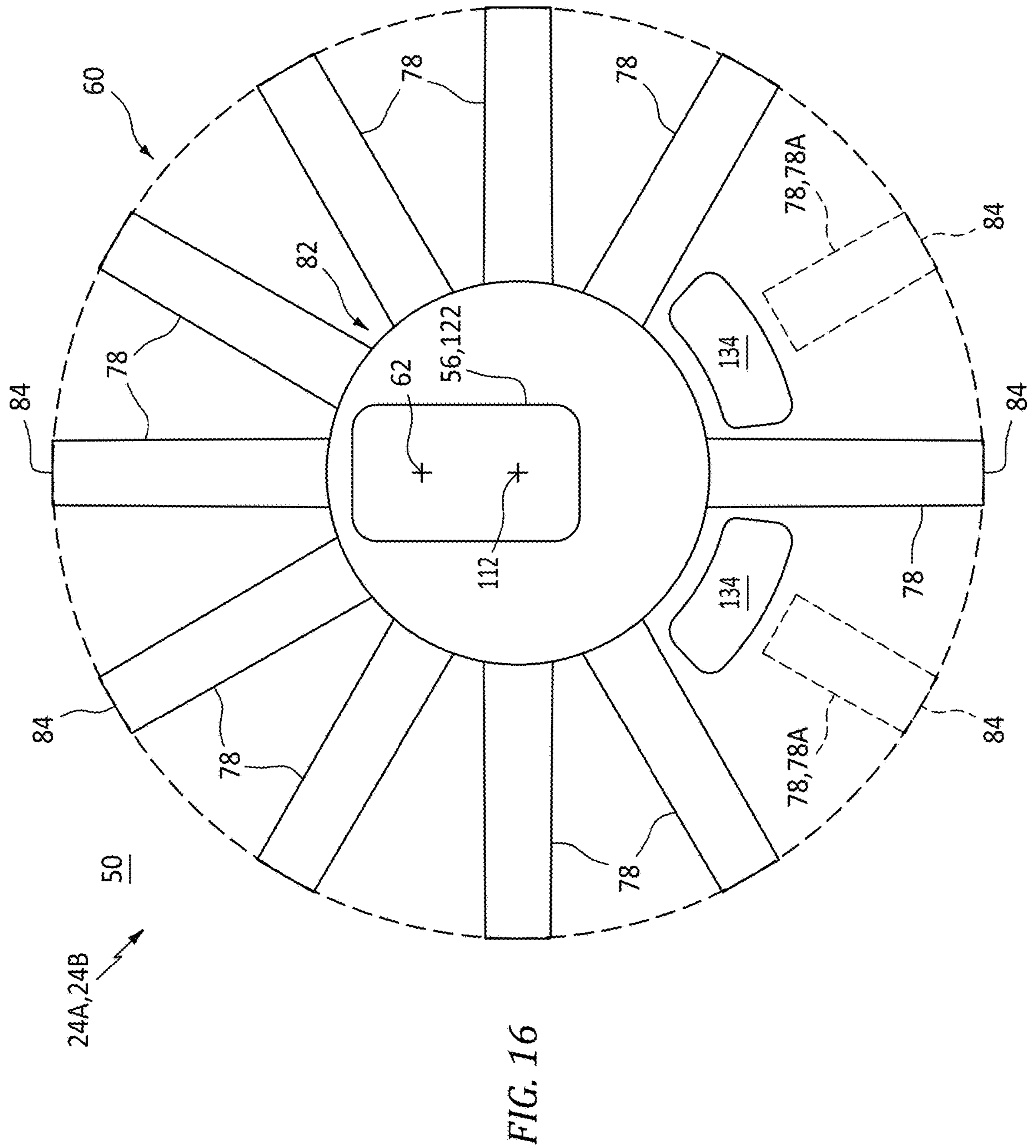
FIGS. 16-18 are partial schematic cross-sectional illustrations of an exemplary one of the propulsion systems with various other inlet section arrangements.
Figure 17:
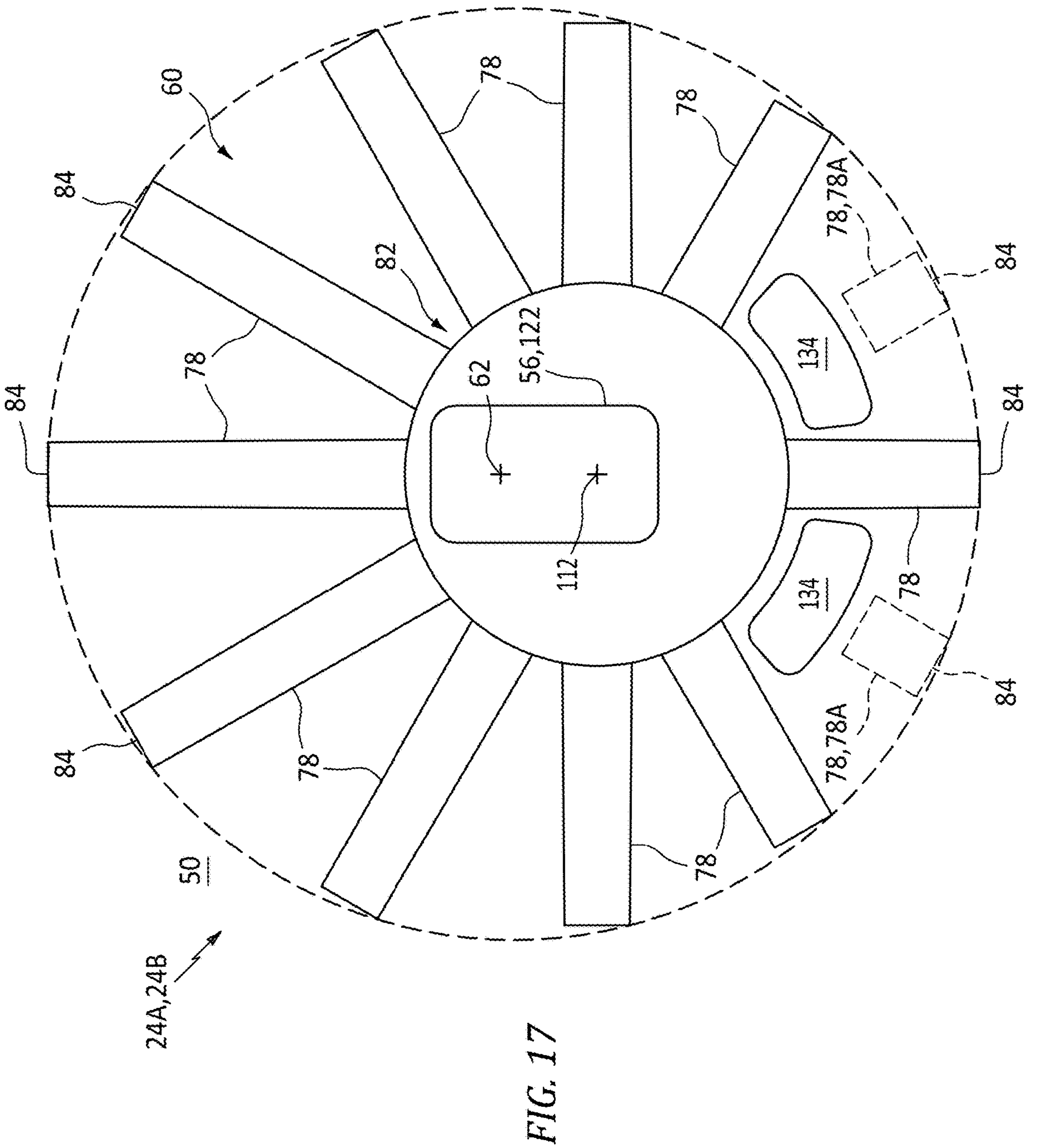
Figure 18:
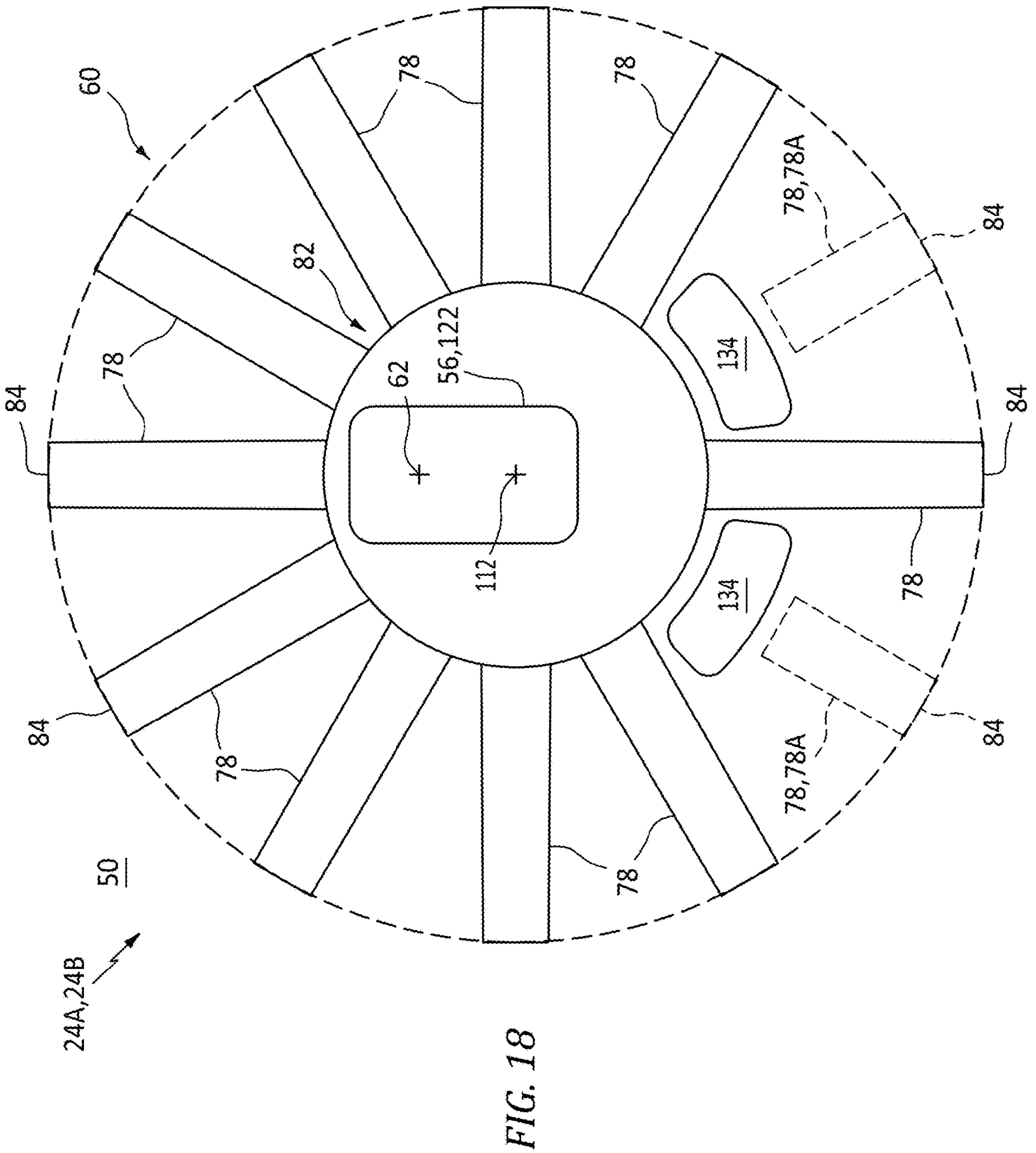

In some embodiments, referring to FIG. 16, the guide vanes 78 may be arranged in a circular array about the engine axis 112. The vane tips 84 of FIG. 16, for example, may be radially equispaced from the engine axis 112. In other embodiments, referring to FIG. 17, the guide vanes 78 may be arranged in a circular array about the propulsor axis 62. The vane tips 84 of FIG. 17, for example, may be radially equispaced from the propulsor axis 62. In still other embodiments, referring to FIG. 18, a first (e.g., top) subset of the guide vanes 78 may be arranged in an arcuate array about the propulsor axis 62, and a second (e.g., bottom) subset of the guide vanes 78 may be arranged in an arcuate array about the engine axis 112. The vane tips 84 of the first subset of the guide vanes 78 of FIG. 18, for example, may be radially equispaced from the propulsor axis 62, and the vane tips 84 of the second subset of the guide vanes 78 may be radially equispaced from the engine axis 112. With such an arrangement, a perimeter defined by the vane tips 84 may be oblong; e.g., oval or racetrack shaped.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

an open propulsor rotor configured to rotate about a first axis;

an open guide vane structure disposed aft of the open propulsor rotor along the first axis, the open guide vane structure including a plurality of open guide vanes arranged circumferentially about a second axis that is offset from the first axis, and the plurality of open guide vanes comprising a first open guide vane;

a turbine engine including a flowpath, a compressor section, a combustor section, a turbine section and a rotating assembly, the flowpath extending through the compressor section, the combustor section and the turbine section from an airflow inlet into the flowpath to a combustion products exhaust from the flowpath, the airflow inlet axially aligned with or located forward of the first open guide vane along the second axis, the rotating assembly comprising a turbine rotor disposed in the turbine section, and the rotating assembly configured to rotate about the second axis; and a drivetrain comprising an offset geartrain, the rotating assembly configured to drive rotation of the open propulsor rotor through the offset geartrain;

wherein the airflow inlet comprises an inlet opening, and the first open guide vane is circumferentially aligned with the inlet opening;

wherein first open guide vane is a fixed first open guide vane; and wherein the plurality of open guide vanes comprises a second adjustable open guide vane that is circumferentially offset from the inlet opening.

2. The assembly of claim 1, wherein the airflow inlet is located axially along the first open guide vane between a leading edge plane and a trailing edge plane;

the leading edge plane is perpendicular to the second axis and is located at a leading edge of the first open guide vane; and the trailing edge plane is perpendicular to the second axis and is located at a trailing edge of the first open guide vane.

3. The assembly of claim 1, wherein the airflow inlet is located axially forward of the first open guide vane.

4. The assembly of claim 1, wherein the airflow inlet is located axially at an aft end of the open propulsor rotor along the second axis.

5. The assembly of claim 1, wherein the airflow inlet is non-annular.

6. The assembly of claim 1, wherein the inlet opening extends circumferentially about the second axis a number of degrees between opposing circumferential ends of the inlet opening; and the number of degrees is equal to or less than one-hundred and twenty degrees.

7. The assembly of claim 1, wherein the airflow inlet is formed collectively by a plurality of openings arranged circumferentially about the second axis, and the plurality of openings include the inlet opening.

8. The assembly of claim 1, wherein the open propulsor rotor includes a rotor base and a plurality of open propulsor blades arranged circumferentially about and connected to the rotor base; and an inner peripheral boundary of the airflow inlet is radially aligned with a radial exterior surface of the rotor base at an aft end of the open propulsor rotor.

9. The assembly of claim 1, wherein the open propulsor rotor includes a rotor base and a plurality of open propulsor blades arranged circumferentially about and connected to the rotor base; and an inner peripheral boundary of the airflow inlet is spaced radially outboard from a radial exterior surface of the rotor base at an aft end of the open propulsor rotor.

10. The assembly of claim 1, wherein an inner end of the first open guide vane is disposed radially outboard of the inlet opening.

11. The assembly of claim 1, further comprising:

a first open rotor propulsion system including the open propulsor rotor, the open guide vane structure, the turbine engine and the drivetrain, and the rotating assembly configured to drive rotation of the open propulsor rotor through the offset geartrain in a first direction about the first axis; and a second open rotor propulsion system including a second open propulsor rotor, a second open guide vane structure, a second turbine engine and a second drivetrain;

the second open propulsor rotor configured to rotate about a third axis;

the second open guide vane structure disposed aft of the second open propulsor rotor along a fourth axis that is offset from the third axis, the second open guide vane structure including a plurality of second open guide vanes arranged circumferentially about the fourth axis, and the plurality of second open guide vanes comprising a second open guide vane;

the second turbine engine including a second flowpath, a second compressor section, a second combustor section, a second turbine section and a second rotating assembly, the second flowpath extending through the second compressor section, the second combustor section and the second turbine section from a second airflow inlet into the second flowpath to a second combustion products exhaust from the second flowpath, the second airflow inlet axially aligned with or located forward of the second open guide vane along the fourth axis, the second rotating assembly comprising a second turbine rotor disposed in the second turbine section, and the second rotating assembly configured to rotate about the fourth axis; and the second drivetrain comprising a second offset geartrain, the second rotating assembly configured to drive rotation of the second open propulsor rotor through the second offset geartrain in a second direction about the third axis, and the second direction rotationally opposite the first direction.

12. The assembly of claim 1, wherein tips of at least some of the plurality of open guide vanes are equispaced from the second axis.

13. The assembly of claim 1, wherein tips of at least some of the plurality of open guide vanes are equispaced from the first axis.

14. An assembly for an aircraft, comprising:

an open propulsor rotor configured to rotate about a first axis;

an open guide vane structure disposed aft of the open propulsor rotor along the first axis, the open guide vane structure including a plurality of open guide vanes arranged circumferentially about a second axis that is offset from the first axis, and the plurality of open guide vanes comprising a first open guide vane;

a turbine engine including a flowpath, a compressor section, a combustor section, a turbine section and a rotating assembly, the flowpath extending through the compressor section, the combustor section and the turbine section from an airflow inlet into the flowpath to a combustion products exhaust from the flowpath, the airflow inlet axially aligned with or located forward of the first open guide vane along the second axis, the rotating assembly comprising a turbine rotor disposed in the turbine section, and the rotating assembly configured to rotate about the second axis; and a drivetrain comprising an offset geartrain, the rotating assembly configured to drive rotation of the open propulsor rotor through the offset geartrain;

wherein the airflow inlet comprises a first inlet opening and a second inlet opening arranged circumferentially about the second axis; and wherein the first open guide vane is aligned circumferentially between the first inlet opening and a second inlet opening about the second axis.

15. An assembly for an aircraft, comprising:

an open propulsor rotor configured to rotate about a first axis;

an open guide vane structure disposed aft of the open propulsor rotor along a second axis that is at least laterally offset from the first axis, the open guide vane structure including a plurality of open guide vanes arranged circumferentially about the second axis, and the plurality of open guide vanes comprising a first open guide vane;

a turbine engine including a flowpath, a compressor section, a combustor section, a turbine section and a rotating assembly, the flowpath extending through the compressor section, the combustor section and the turbine section from an airflow inlet into the flowpath to a combustion products exhaust from the flowpath, the airflow inlet comprising a non-annular inlet opening wherein an inner end of the first open guide vane is circumferentially aligned with and radially outboard of the non-annular inlet opening, the rotating assembly comprising a turbine rotor disposed in the turbine section, and the rotating assembly configured to rotate about the second axis; and a drivetrain comprising an offset geartrain, the rotating assembly configured to drive rotation of the open propulsor rotor through the offset geartrain.

* * * * *